US012647060B2

(12) United States Patent
Momen et al.

(10) Patent No.: US 12,647,060 B2
(45) Date of Patent: Jun. 2, 2026

(54) ROTOR FLUX CONTROL IN A PERMANENT MAGNET ELECTRIC MACHINE

(71) Applicant: GM Global Technology Operations LLC, Detroit, MI (US)

(72) Inventors: Mohammad F. Momen, Rochester Hills, MI (US); Mazharul Chowdhury, Canton, MI (US); Michael C. Muir, Troy, MI (US); Jared Lee, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 385 days.

(21) Appl. No.: 18/448,464

(22) Filed: Aug. 11, 2023

(65) Prior Publication Data

US 2025/0055403 A1     Feb. 13, 2025

(51) Int. Cl.
*H02P 29/66* (2016.01)
*B60K 11/00* (2006.01)
*B60L 15/20* (2006.01)

(52) U.S. Cl.
CPC ............ *H02P 29/662* (2016.11); *B60L 15/20* (2013.01); *B60K 11/00* (2013.01); *B60L 2240/421* (2013.01); *B60L 2240/423* (2013.01); *B60L 2240/425* (2013.01); *H02P 2207/05* (2013.01)

(58) Field of Classification Search
CPC .... H02P 29/662; H02P 2207/05; B60L 15/20; B60L 2240/421; B60L 2240/423; B60L 2240/425; B60K 11/00
See application file for complete search history.

(56) References Cited

U.S. PATENT DOCUMENTS

2013/0300332 A1* 11/2013 Inamura ................ H02P 29/032
                                                        318/472
2015/0120105 A1*  4/2015 Naqvi ..................... B60L 50/61
                                                        701/22
2018/0367075 A1* 12/2018 Barry ...................... H02P 23/00
                         (Continued)

FOREIGN PATENT DOCUMENTS

DE        102019208161 A1    12/2020
DE        102021000844 A1     5/2021

OTHER PUBLICATIONS

DE Office Action for Appln No. 10 2023 132 933.2 dated Jun. 5, 2024, 6 pages.

(Continued)

*Primary Examiner* — Zoheb S Imtiaz
(74) *Attorney, Agent, or Firm* — CANTOR COLBURN LLP

(57) ABSTRACT

Rotor flux control in a permanent magnet (PM) electric machine involves controlling fluid flow through the rotor based on the torque versus speed operating point of the PM machine. When the torque at a given speed falls below a predetermined threshold, the rotor receives a reduced fluid flow compared to when the torque is above the threshold. Fluid flow through the stator is controlled in an inverse manner relative to the rotor's fluid flow such that when the rotor experiences reduced fluid flow, the stator receives an increased fluid flow. This approach enables efficient control of the rotor's magnetic flux, enhancing the performance and efficiency of the PM electric machine during various operating conditions.

18 Claims, 5 Drawing Sheets

(56)     References Cited

U.S. PATENT DOCUMENTS

| | | | |
|---|---|---|---|
| 2021/0277908 A1* | 9/2021 | Yang ..................... | F04D 27/001 |
| 2022/0118951 A1* | 4/2022 | Gutowski ............. | B60J 1/2016 |

OTHER PUBLICATIONS

Schroder, "Aktive thermische Feldschwachung bei elektrischen Maschinen", Motortechnische Zeitschrift: MTZ, Bd. 83, 2022, H. 07-08_S28-35.-ISSN 0024-8525, 8 pages.

\* cited by examiner

ROTOR FLUX CONTROL IN A PERMANENT MAGNET ELECTRIC MACHINE

INTRODUCTION

The disclosure relates to rotary electric machines. More particularly, the disclosure relates to alternating current (AC) permanent magnet (PM) electric machines.

AC PM electric machines operate within a torque versus speed space defined within a peak performance boundary and generally split between constant torque and constant power regions. AC PM machines may be designed with permanent magnets having large magnetic flux density which affects machine performance. Larger magnetic flux density is generally desirable in AC PM machines except at low torque outputs particularly at higher speeds above the motor base speed where back electromotive force (EMF) becomes more pronounced and machine efficiency suffers due to higher copper losses and iron losses from additional current required for field weakening operation. Samarium cobalt and neodymium are examples of magnets commonly employed in high power motor applications such as automotive powertrains. Such magnets experience reduced flux density as temperature increases. Temperature dependent flux density changes are generally reversible below a critical temperature but may be irreversible if the critical temperature is exceeded. Thus, active motor cooling may be used to keep magnet temperatures below such critical temperatures and may include circulating oil through the rotor and stator.

SUMMARY

In one exemplary embodiment, a method for rotor flux control in a permanent magnet (PM) electric machine may include controlling a fluid flow through the rotor based upon an operating point of the PM electric machine such that the rotor receives a reduced fluid flow when the operating point of the PM electric machine is below a predetermined threshold relative to a fluid flow when the operating point of the PM electric machine is above the predetermined threshold.

In addition to one or more of the features described herein, the operating point of the PM electric machine may include a PM electric machine torque and the predetermined threshold may include a torque threshold.

In addition to one or more of the features described herein, the operating point of the PM electric machine may include a PM electric machine torque at a machine speed, and the predetermined threshold may include a torque threshold at the machine speed.

In addition to one or more of the features described herein, the operating point of the PM electric machine may include a PM electric machine torque at a machine speed at a DC voltage, and the predetermined threshold may include a torque threshold at the machine speed at the DC voltage.

In addition to one or more of the features described herein, the method for rotor flux control in a PM electric machine may further include controlling a fluid flow through a stator of the PM electric machine inversely relative to the fluid flow received by the rotor such that the stator receives an increased fluid flow when the rotor receives a reduced fluid flow.

In addition to one or more of the features described herein, controlling the fluid flow through the rotor may include controlling the fluid flow with a solenoid valve.

In addition to one or more of the features described herein, controlling the fluid flow through the rotor based upon the operating point of the PM electric machine such that the rotor receives the reduced fluid flow when the operating point of the PM electric machine is below the predetermined threshold relative to the fluid flow when the operating point of the PM electric machine is above the predetermined threshold occurs above a predetermined PM electric machine speed.

In addition to one or more of the features described herein, the predetermined PM electric machine speed may include a base speed for the PM machine.

In another exemplary embodiment, a propulsion system for an electrified vehicle may include a permanent magnet (PM) electric machine, a gear unit connected to the PM electric machine, a cooling system for controllably circulating a fluid through passages in a rotor of the PM electric machine, the cooling system including a variable force solenoid valve receiving a pressurized fluid and controlling circulation of the pressurized fluid through the rotor in response to a control command, and a controller providing the control command effecting a fluid flow through the rotor based upon an operating point of the PM electric machine such that the fluid flow through the rotor is reduced when the operating point of the PM electric machine is below a predetermined threshold relative to a fluid flow through the rotor when the operating point of the PM electric machine is above the predetermined threshold.

In addition to one or more of the features described herein, the operating point of the PM electric machine may include a PM electric machine torque and the predetermined threshold may include a torque threshold.

In addition to one or more of the features described herein, the operating point of the PM electric machine may include a PM electric machine torque at a machine speed, and the predetermined threshold may include a torque threshold at the machine speed.

In addition to one or more of the features described herein, the operating point of the PM electric machine may include a PM electric machine torque at a machine speed at a DC voltage, and the predetermined threshold may include a torque threshold at the machine speed at the DC voltage.

In addition to one or more of the features described herein, the cooling system for controllably circulating the fluid through passages in the rotor of the PM electric machine diverts fluid not circulated through the passages in the rotor of the PM electric machine through a stator of the PM electric machine such that the stator receives an increased fluid flow when the rotor receives a reduced fluid flow.

In addition to one or more of the features described herein, the controller providing the control command effecting the fluid flow through the rotor based upon the operating point of the PM electric machine such that the fluid flow through the rotor is reduced when the operating point of the PM electric machine is below the predetermined threshold relative to the fluid flow through the rotor when the operating point of the PM electric machine is above the predetermined threshold may further provide the control command above a predetermined PM electric machine speed.

In yet another exemplary embodiment, a method for rotor flux control in a permanent magnet (PM) electric machine may include controlling a fluid flow through the rotor based upon an operating point of the PM electric machine including torque versus speed such that the rotor receives a reduced fluid flow when the torque of the PM electric machine at the speed of the PM electric machine is below a predetermined torque threshold relative to a fluid flow when the torque of the PM electric machine at the speed of the PM electric machine is above the predetermined torque threshold, and controlling a fluid flow through a stator of the PM electric machine inversely relative to the fluid flow through the rotor such that the stator receives an increased fluid flow when the rotor receives a reduced fluid flow.

In addition to one or more of the features described herein, the operating point of the PM electric machine may further include a DC link voltage and controlling the fluid flow through the rotor is based upon the operating point of the PM electric machine in torque versus speed and the DC link voltage.

In addition to one or more of the features described herein, controlling the fluid flow through the rotor may include controlling the fluid flow with a solenoid valve.

In addition to one or more of the features described herein, controlling the fluid flow through the rotor based upon the operating point of the PM electric machine such that the rotor receives the reduced fluid flow when the torque of the PM electric machine at the speed of the PM electric machine is below a predetermined torque threshold relative to the fluid flow when the torque of the PM electric machine at the speed of the PM electric machine is above the predetermined torque threshold occurs above a predetermined PM electric machine speed.

In addition to one or more of the features described herein, the predetermined PM electric machine speed may include a base speed for the PM machine.

In addition to one or more of the features described herein, controlling the fluid flow through the rotor based upon the operating point of the PM electric machine such that the rotor receives the reduced fluid flow when the torque of the PM electric machine at the speed and the DC link voltage of the PM electric machine is below a predetermined torque threshold relative to the fluid flow when the torque of the PM electric machine at the speed and the DC link voltage of the PM electric machine is above the predetermined torque threshold occurs above a predetermined PM electric machine speed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
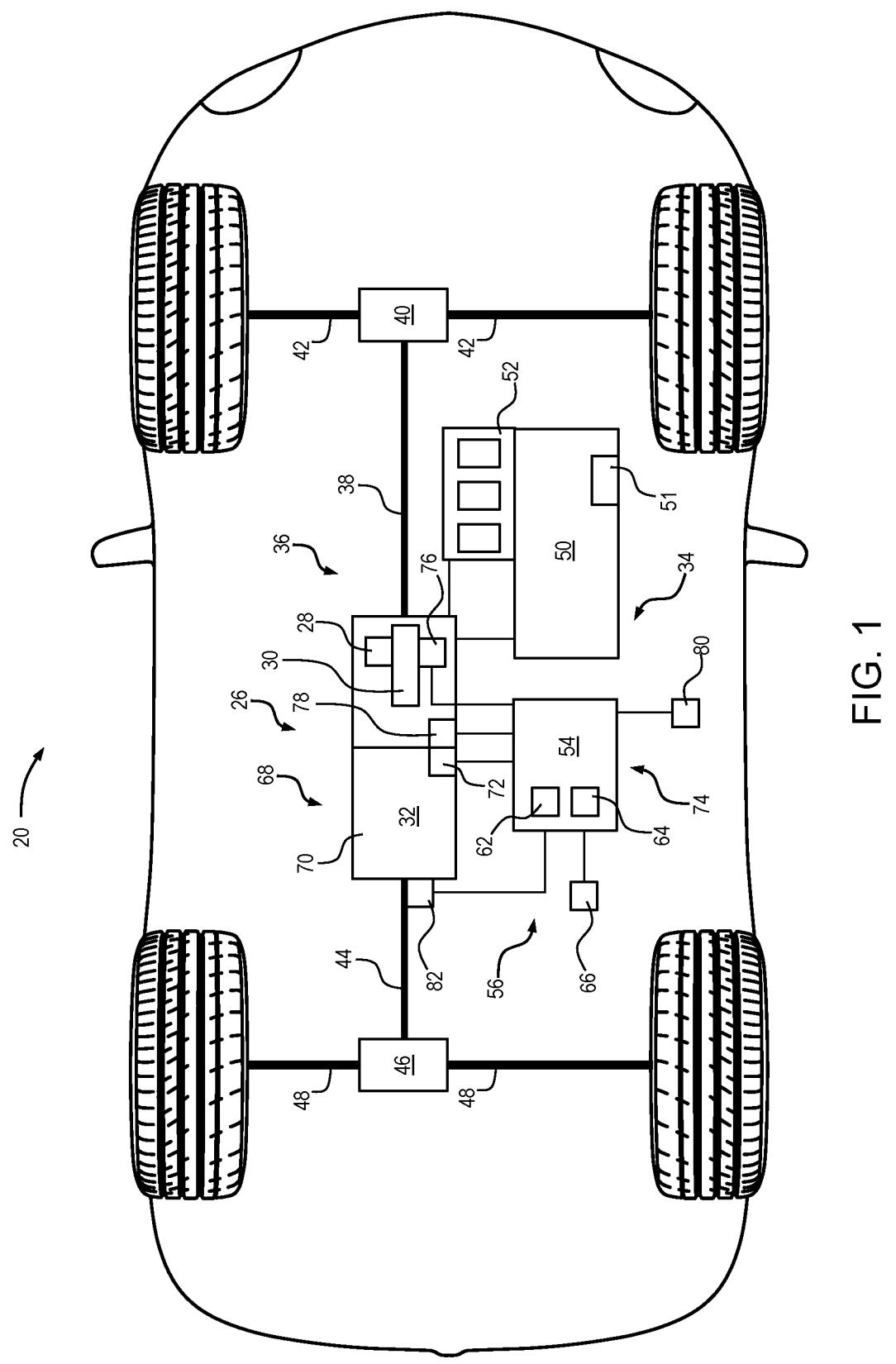
FIG. 1 is a schematic illustration of an electric vehicle with a drive system including a cooled rotor, in accordance with various embodiments.

Referring to FIG. 1, certain features of a electrified vehicle 20 are illustrated in functional block diagram form. In various embodiments, the electrified vehicle 20 includes a number of wheels 22. The electrified vehicle 20 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive. In other embodiments, the electrified vehicle 20 may be any one of another different types of land, sea or air vehicle with a motor supplying power to drive equipment, such as to propel the electrified vehicle 20. As depicted in FIG. 1, the electrified vehicle 20 includes a body 24 supported by the wheels 22. The body 24 may be arranged on, or integrated with, a chassis (not shown). In various embodiments the electrified vehicle 20 may differ from that depicted in FIG. 1. For example, in certain embodiments the number of wheels 22, the drive axles, and/or the style of the body 24 may vary.

An electric drive system with a propulsion system 26 is included in a electrified vehicle 20. In general, the propulsion system 26 may include an electric machine 30, a gear unit 32, and a propulsion control system 34. In the embodiment illustrated in FIG. 1, the propulsion system 26 supplies torque to drive the wheels 22 through a driveline 36. In various embodiments, the driveline 36 may be configured to couple the front wheels 22 with the propulsion system 26, such as through shaft 38, gearbox 40 and axle 42. In other embodiments, the driveline 36 may be configured to couple the rear wheels 22 with the propulsion system 26, such as through the shaft 44, the gearbox 46 and the axle 48. As illustrated, the driveline 36 is configured to couple all four wheels 22 with the propulsion system 26.

The electric machine 30 may be any of various types of electric motors that operate to supply rotary torque to the driveline 36 as to function as a traction motor for the electrified vehicle 20. The electric machine 30 may also be capable of operating as a generator receiving rotary torque from the driveline 36. The gear unit 32 connects the electric machine 30 with the driveline 36 and is capable of operating to transfer torque in either direction. The gear unit 32 may include a number of meshing gears to transfer torque to and from the driveline 36 and may be configured with a single fixed gear ratio. In embodiments, the electric machine 30 and the gear unit 32 may be integrated in an electric drive unit. The gearboxes 40, 46 transfer torque from their respective shaft 38, 44 to their respective axle 42, 48 and may provide a differential function in splitting torque to the wheels 22. The gearboxes 40, 46 may also each have a single fixed gear ratio.

The electric machine 30 is supplied with power by a rechargeable energy storage system (RESS) 50. The RESS 50 is mounted on the body 24 of the electrified vehicle 20, and is electrically connected with the power electronics 52. In the current embodiment, the RESS 50 includes at least one rechargeable battery having a pack of battery cells. In other embodiments the RESS 50 includes another type of electrical energy storage device. The power electronics 52 may include various electric vehicle elements such as a power inverter module driving the electric machine 30, an accessory power module, an onboard charger module, etc. The RESS 50 therefor may be coupled to the power inverter module via a DC link at a DC link voltage that corresponds to the RESS DC voltage.

A controller 54 is coupled with the electric machine 30, the power electronics 52, the RESS 50, the propulsion system 26, and various sensors as described herein. As will be appreciated, the controller 54 may be coupled to a number of other devices and systems of the electrified vehicle 20. The controller 54 utilizes data and information and measured values from the various sensors. Generally, the controller 54 is configured to receive inputs from the various sensors which are configured to generate signals in proportion to various physical input parameters associated with the electrified vehicle 20, its subsystems, and other interrelated systems. For example, based on the parameters the controller 54 is configured to operate the electric machine 30 at various rotational speeds and in both rotational directions to propel the vehicle at various speeds and in forward and reverse directions.

As illustrated in FIG. 1, the controller 54 is a part of or includes a computer system 56. It will be appreciated that the controller 54 may otherwise differ from the example depicted in FIG. 1. The controller 54 may be configured as any number of controllers and/or microcontrollers in communication with each other. For example, separate individual controllers may control aspects of the propulsion system 26 and the RESS 50. Accordingly, references to one controller include arrangements with one or more controllers. The controller 54 is coupled in the propulsion control system 34, such as with the propulsion system 26, and is coupled with other devices and systems of the electrified vehicle 20. The controller 54 may accept information from various sources, process that information, and provide control commands based thereon to effect outcomes such as operation of the electrified vehicle 20 and its systems, including of the propulsion control system 34. In the depicted embodiment, the controller 54 includes a processor

62 and a memory device 64, and is coupled with a storage device 66. The processor 62 performs the computation and control functions of the controller 54, and may include any type of processor or multiple processors, single integrated circuits such as a microprocessor, or any suitable number of integrated circuit devices and/or circuit boards working in cooperation to accomplish the functions of a processing unit. During operation, the processor 62 may execute one or more programs and may use data, each of which may be contained within the storage device 66 and as such, the processor 62 controls the general operation of the controller 54 in executing the processes described herein, such as the processes and methods described in greater herein.

The memory device 64 may be any type of suitable memory. For example, the memory device 64 may include volatile and nonvolatile storage in read-only memory (ROM), random-access memory (RAM), and keep-alive memory (KAM), for example. KAM is a persistent or non-volatile memory that may be used to store various operating variables while the processor 62 is powered down. The memory device 64 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 54. In the depicted embodiment, the memory device 64 may store the above-referenced programs along with one or more stored values of the data such as for short-term data access.

The storage device 66 stores the data, such as for long-term data access for use in automatically controlling the electrified vehicle 20 and its systems. The storage device 66 may be any suitable type of storage apparatus, including direct access storage devices such as disk drives and flash systems. The storage device 66 includes a non-transitory computer readable medium configured to store data, such as on the electrified vehicle 20. In one exemplary embodiment, the storage device 66 includes a source from which the memory device 64 receives the programs that execute one or more embodiments of one or more processes of the present disclosure. In another exemplary embodiment, the programs may be directly stored in and/or otherwise accessed by the memory device 64. The programs represent executable instructions, used by the controller 54 in processing information and in controlling the electrified vehicle 20 and its systems, including the propulsion control system 34 and a cooling system 68 associated with the electric machine 30 and the gear unit 32, as further described herein.

As part of the cooling system 68, the gear unit 32 includes a sump 70 that contains a supply of fluid, in this case oil, that is circulated by a pump 72. The pump 72 may be electrically driven and in this embodiment is coupled with the controller 54 for controlled operation. In general, the pump 72 provided pressurized fluid 88 for controlled circulation within the gear unit 32 and the electric machine 30. A cooling control system 74 is provided that generally includes the controller 54, a control valve 76, a temperature sensor 78 disposed in the sump 70, a throttle position sensor 80, a DC voltage sensor 51, a vehicle speed sensor 82, and a machine speed sensor 28 and is coupled with the pump 72. In other embodiments, the cooling control system 74 may monitor other parameters of the propulsion system 26 or of the electrified vehicle 20 generally, and may command control actions based on those other parameters. While the components of the propulsion control system 34 and the cooling control system 74 are depicted as being part of the same system, it will be appreciated that in certain embodiments these features may include multiple systems. In addition, in various embodiments the cooling control system 74 may include all or part of, and/or may be coupled to, various other vehicle devices and systems, such as, among others, the propulsion system 26 and/or other systems of the electrified vehicle 20.

Figure 2:
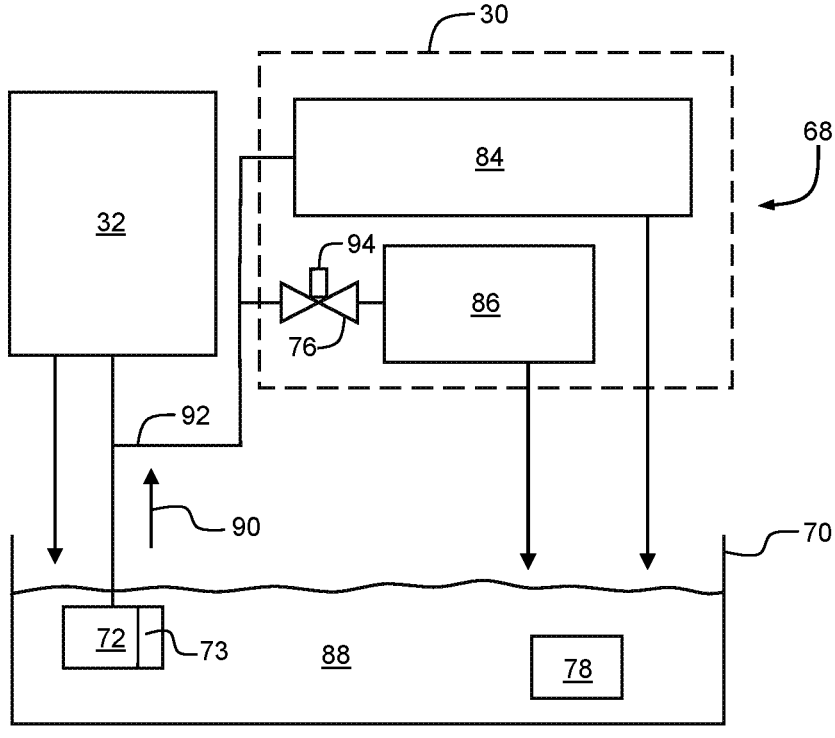
FIG. 2 is a schematic illustration of a cooling system of the drive system of FIG. 1, in accordance with various embodiments.

Referring to FIG. 2, a part of the cooling system 68 is illustrated in schematic form and with added detail. The electric machine 30 includes a stator 84 and a rotor 86. The sump 70 contains a quantity of fluid 88, in this embodiment oil. The pump 72 is driven by an electric motor 73, which is coupled with the controller 54. The pump 72 delivers a supply 90 of the fluid 88 from the sump 70 through a conduit system 92 to each of the gear unit 32, the stator 84 and the rotor 86. The fluid 88 returns to the sump 70 after flowing through each of the gear unit 32, the stator 84 and the rotor 86. The supply 90 of the fluid 88 directed to the gear unit 32 may be delivered at a set design flow rate for the output pressure of the pump 72 within the conduit system 92, and the supply 90 delivered to the stator 84 is also delivered at a set design flow rate, in each case, such as by including a calibrated orifice size in the conduit system 92.

The supply 90 of the fluid 88 directed to the rotor 86 passes through the control valve 76. Accordingly, the flow rate of the fluid 88 is controllable as a function of determinable parameters of the propulsion system 26 and/or of the electrified vehicle 20 by varying the degree to which the control valve 76 is open. In the current embodiment, the control valve 76 is a variable force solenoid valve that includes an electric actuator in the form of a solenoid 94. Accordingly, the control valve 76 controls pressure (and therefore flow rate), of the fluid 88 delivered to the rotor 86, such as in proportion to the current level of the signal supplied to the solenoid as controlled by the controller 54. A higher pressure output from the control valve 76 results in an increased flow rate of the fluid 88 supplied to cool the rotor 86. A lower pressure output from the control valve 76 results in decreased flow rate of the fluid 88 supplied to cool the rotor 86. Control may be calibrated to optimize fluid flow rate to balance operating efficiency with cooling requirements across a spectrum of operating conditions of the electric machine 30. In other embodiments, a different type of valve actuator may be used. For example, other electrically driven translatable or rotatable actuator elements may be used to control orifice size, or selective valve state either ON (full flow) or OFF (no flow).

Figure 3:
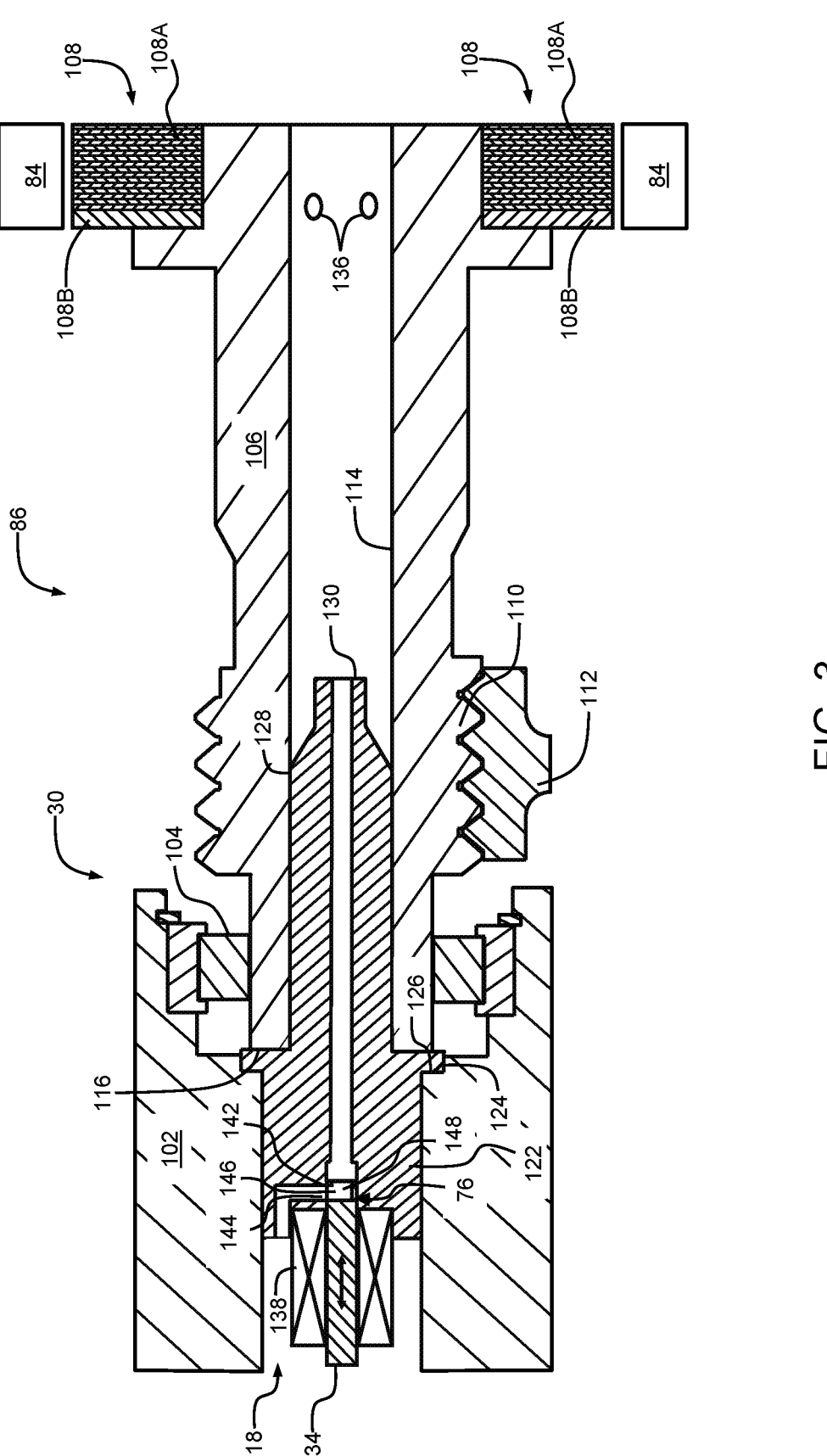
FIG. 3 is a schematic cross-sectional illustration of a part of the drive system of FIG. 1, in accordance with various embodiments.

Referring to FIG. 3, a schematic cross section of a part of the electric machine 30 shows the location of the control valve 76 in this embodiment. The rotor 86 is rotatably supported within the stator 84 and on a housing 102 of the electric machine 30 by a bearing assembly 104. The rotor 86 includes a shaft 106 and a core assembly 108 supported on the shaft 106. The core assembly 108 may be fabricated from stacked laminations 108A of electrical steel between end plates 108B. The stator 84 may also be fabricated from stacked laminations of electrical steel. An output gear 110 is fixed on the shaft 106 and meshes with a gear 112 of the gear unit 32 to supply torque out of the electric machine 30. The shaft 106 has a longitudinal bore 114 that opens through its end 116 registering with a cavity 118 in the housing 102. The cavity 118 forms a part of the conduit system 92 supplied with the fluid 88 by the pump 72.

A guide 120 is disposed at the interface between the shaft 106 and the housing 102. The guide 120 includes a cylindrical section 122 that is disposed in the cavity 118, a flange 124 that extends radially outward from the cylindrical section 122 and abuts the housing 102 at a shoulder 126, and a pin 128 that extends into the bore 114. The pin 128 extends longitudinally from the flange 124 on the side of the flange 124 opposite the cylindrical section 122, and is sized to fit within the bore 114. The pin 128 includes a tapered end 130 at its end opposite the flange 124. The tapered end 130 has a diameter substantially smaller that the diameter of the bore 114. A bore 132 extends through the guide 120 from its end 116 in the cavity 118 to the tapered end 130 in the bore 114. Accordingly, the guide 120 provides a flow path from the cavity 118 to the bore 114 through the bore 132. The shaft 106 includes a number of openings 136 that extend radially through the shaft and are disposed to register with the bore 114 and with fluid passages formed within the core assembly 108 of the rotor 86. Accordingly, the fluid 88 is admitted to these rotor fluid passages via the bores 132, 114 and the openings 136 to cool the rotor 86. The stator may have similar fluid passages formed therein with the fluid 88 admitted therein via the conduit system 92 including the calibrated orifice. In the present embodiment, since the conduit system 92 supplies the fluid 88 to both the rotor 86 and the stator 84 and the gear unit 32, reduction in fluid flow to the rotor results in increase in fluid flow to the stator 84 and gear unit 32.

The control valve 76 is positioned in the bore 132 of the guide 120 to control the fluid 88 flowing therethrough, enabling control of the amount of fluid 88 admitted through the rotor 86. The solenoid 94 is disposed in the cavity 118. The solenoid 94 includes a coil 138 and a core 134 that moves in response to a magnetic field generated by the coil 138, such as in response to a current supplied under control of the controller 54. The control valve 76 includes a spool 142 connected with the core 134. The guide 120 serves as the valve body containing the spool 142. Orifices 144 are provided through the guide 120 to supply the fluid from the cavity 118 to the spool 142. The spool 142 includes orifices 146 that register to varying degrees with the orifices 144 depending on the positioning of the core 134. The orifices 146 register with a longitudinal bore 148 in the spool 142 that opens to the bore 132. The orifices 144 and 146, the longitudinal bore 148 and the bore 132 are sized to deliver the maximum flow rate that is required by the rotor 86 under all operating conditions, when the control valve 76 is fully open. Movement of the spool 142 by the core 138 may result in a full open state, a range of throttled states, or a fully closed state of the control valve 76, depending on cooling needs of the rotor 86.

When the electric machine 30 is assembled, the control valve 76 is inserted into the bore 132 and the guide 120 is then inserted into the cavity 118 until the flange 124 engages the shoulder 126 of the housing 102. The bearing assembly 104 may be positioned into the housing 102 before or following insertion of the guide 120. The rotor 86 is then moved into position with the tapered end 130 of the guide 120 entering the bore 114 and guiding the shaft 106 into an axially centered position. As the shaft 106 moves closer to the flange 124, the guide 120 centers the shaft 106 relative to the bearing assembly 104 so that the shaft 106 may move into its assembled position with its end 116 engaging the flange 124 and extending through the bearing assembly 104. Accordingly, the guide 120 serves a guiding function in assembling the rotor 86 to be supported by the bearing assembly 104, in addition to providing a controllable flow path for the fluid 88.

Figure 4:
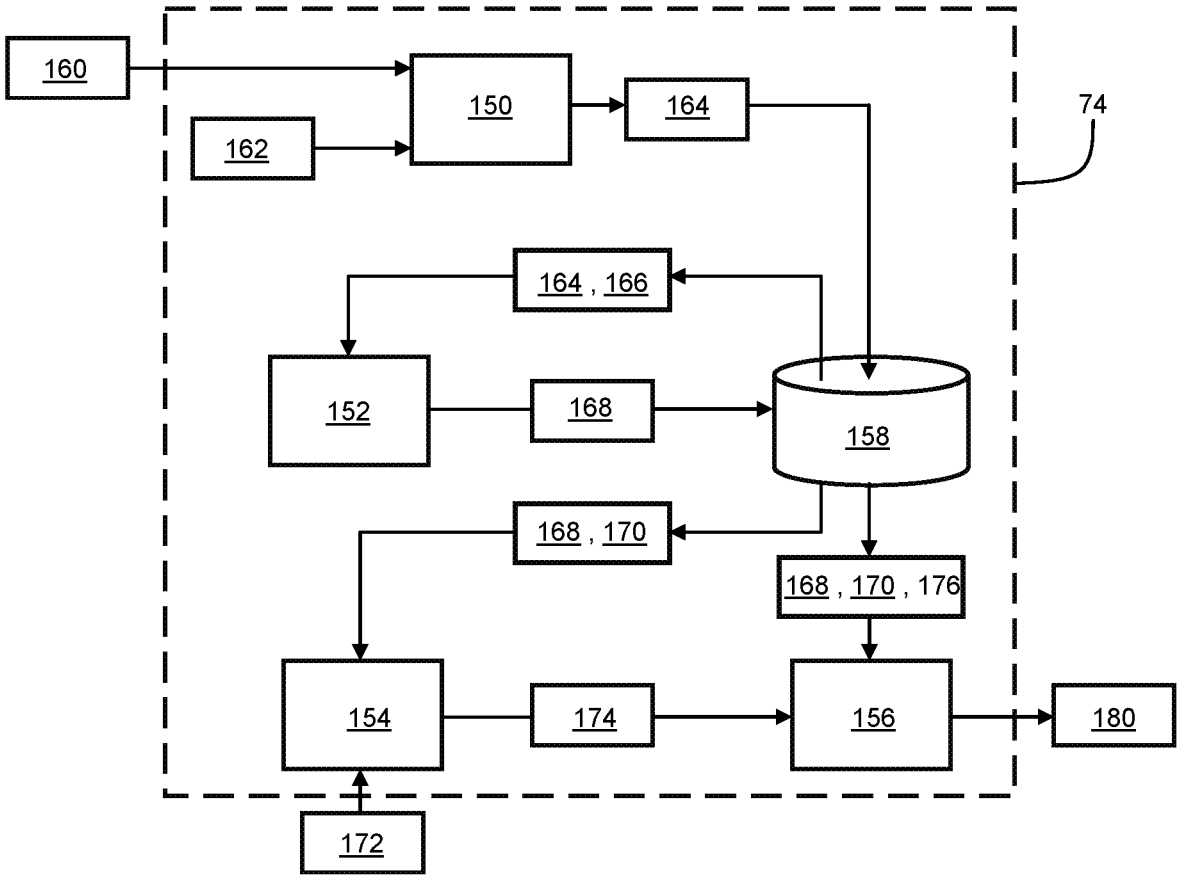
FIG. 4 is a dataflow diagram illustrating elements of a cooling control system of the drive and cooling system of FIGS. 1-3, in accordance with various embodiments.

Referring to FIG. 4, elements of the cooling control system 74 for dynamic flow control are illustrated in dataflow diagram form in accordance with various embodiments. As will be appreciated, various embodiments of the cooling control system 74 according to the present disclosure may include any number of modules embedded within the controller 54 or in multiple controllers, which may be combined and/or further partitioned to implement the systems and methods described herein. Inputs to the cooling control system 74 may be received from various sensors of the electrified vehicle 20 including the temperature sensor 78, the throttle position sensor 80, the DC voltage sensor 51, the vehicle speed sensor 82, and the machine speed sensor 28, from other control modules (not shown) associated with the electrified vehicle 20, and/or determined by other submodules (not shown) within the controller 54. For simplicity, descriptions may refer to one controller 54, which means one or more controllers. The cooling control system 74 may be configured to include a flow rate requirements module 150, a composite rotor flow rate module 152, a pump flow rate module 154, a cooling system control module 156, and a datastore 158.

In various embodiments, the flow rate requirements module 150 receives as input sensed data 160 and flow rate model data 162, such as from the datastore 158. The sensed data 160 may include data from the temperature sensor 78, the throttle position sensor 80, the DC voltage sensor 51, the vehicle speed sensor 82, the machine speed sensor 28, and other sensors as desired to account for parameters selected for control purposes. The flow rate model data 162 may include a model of the propulsion system 26 that correlates the sensed data 160 to flow rate requirements. As an example, a model for flow rate may include a two-dimensional lookup table that plots flow rate as a function of torque demand indicated by the throttle position sensor 80 versus motor speed indicated by the machine speed sensor 28. Additionally, a model for flow rate may also include a three-dimensional lookup table that plots flow rate as a function of torque demand indicated by the throttle position sensor 80 versus motor speed indicated by the machine speed sensor 28 versus DC voltage indicated by the DC voltage sensor 51. Similar approaches may be used for the other parameters. In other embodiments, math based models may be constructed using commercially available modelling software and/or by characteristic testing for a variety of parameters indicative of a cooling load need of the rotor 86. Similar approaches may be used for all of the models described herein. The flow rate requirements module 150 results in flow rate data 164 that may include a number of flow rate requirements based on different parameters. Accordingly, the flow rate data 164 includes a number of data points representing flow rate requirements of the rotor 86 based on different parameters. The flow rate data 164 obtained from the flow rate model data 162 and/or the sensed data 160 is stored in the datastore 158.

In various embodiments, the composite rotor flow rate module 152 receives as input the flow rate data 164 and combination model data 166, such as from the datastore 158. Because the flow rate data 164 includes a number of data points representing flow rate requirements of the rotor 86 based on different parameters, the composite rotor flow rate module 152 computes a single flow rate requirement for setting the control valve 76 based on current parameters. The combination model data 166 may be stored in the datastore when the electrified vehicle 20 is manufactured and correlates the various values of the flow rate data 164 to a single calibrated flow rate requirement of the of the rotor 86. The composite rotor flow rate module 152 computes, using the flow rate data 164, and the combination model data 166, a required flow rate data 168 value for the control valve 76. In some embodiments, the composite rotor flow rate module 152 may select the value in the flow rate data 164 that has the greatest magnitude, ensuring that the flow rate supplied meets all requirements. In other embodiments, the combination model data 166 may weigh individual flow rate requirements and compute a composite value that is different than any of the individual values. For example, the number of parameters may compound the cooling requirements and lead to the computation of a flow rate that matches the compounded amount. The value of the required flow rate data 168 represents the flow rate of the fluid 88 to be supplied to the rotor 86 through the control valve 76. The required flow rate data 168 is stored in the datastore 158.

In various embodiments, the pump flow rate module 154 receives as input the required flow rate data 168, pump model data 170, such as from the datastore 158, and pump requirements data 172, such as from a remote module that determines pump flow requirements for the gear unit 32 and the stator 84. In some embodiments, the pump requirements data 172 may be fixed constant values regardless of operational parameters, where the values are determined during product development to ensure sufficient flow for all operating conditions. In other embodiments, the pump requirements may be determined in real-time based on current parameters. In embodiments, the pump flow rate module 154 adds the pump flow requirements for the gear unit 32 and the stator 84 as received in the pump requirements data 172 to the required flow rate data 168 to result in a value for total pump flow rate data 174.

Using the total pump flow rate data 174, the required flow rate data 168, the pump model data 170, and control valve model data 176, such as received from the datastore, the cooling system control module 156 generates control data 180 that controls the cooling system 68, such as by setting the opening state of the control valve 76 via a variable current signal, and setting the speed of the pump 72 via a variable current and/or voltage signal. For example, a lookup table or multiple lookup tables may be used to correlate flow requirements to electrical current supply based on the flow rates. In other embodiments, a more complex model may be used where the model is constructed using computational modelling software for analyzing the propulsion system 26 and/or using characteristic testing.

Figure 5:
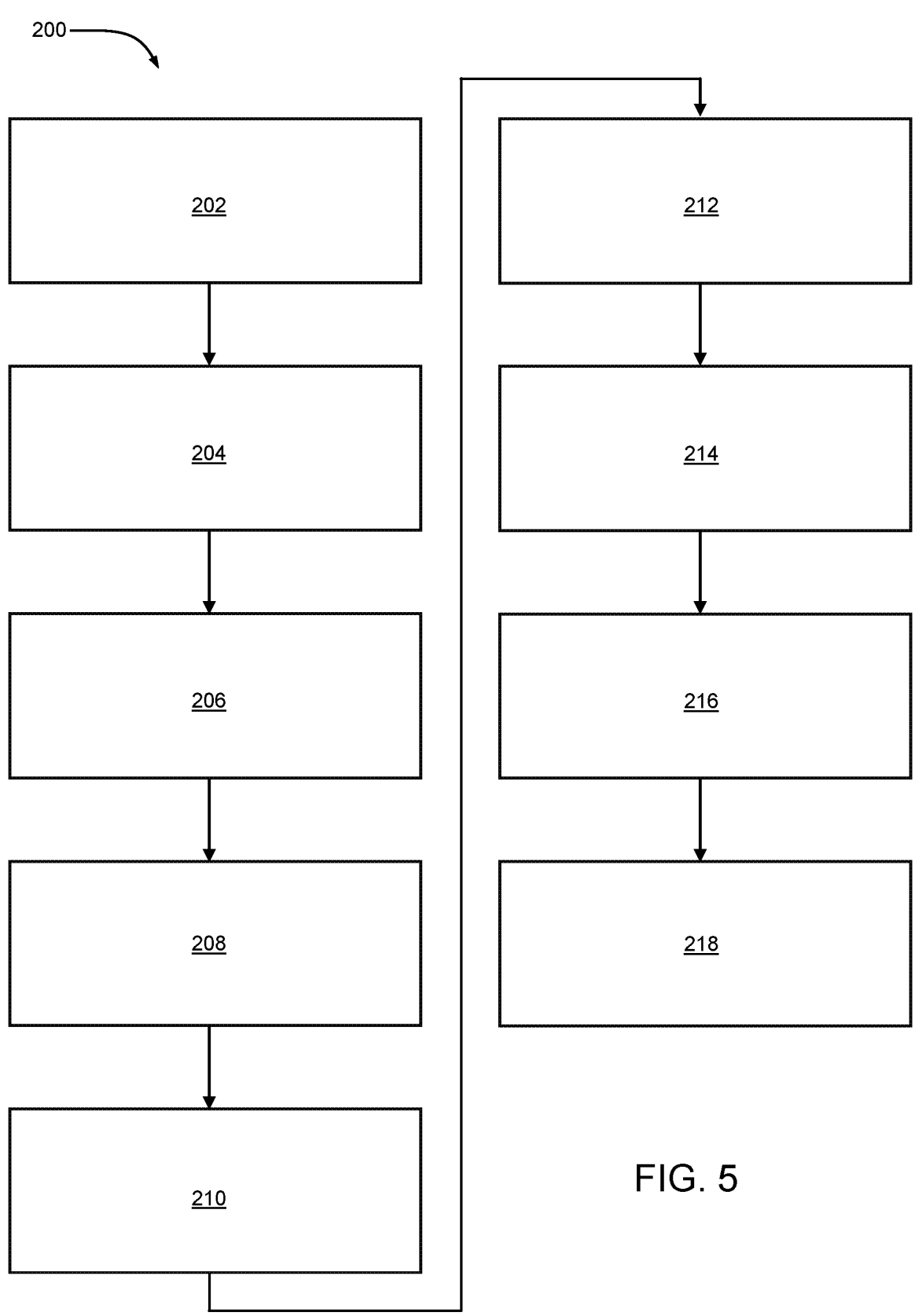
FIG. 5 is a flow chart of a process for rotor flux control, in accordance with various embodiments.

Referring to FIG. 5, a method 200 is illustrated for operation of the cooling control system 74. As will be appreciated in light of the current disclosure, the order of operation of the steps within the method 200 is not limited to the sequential execution as illustrated in FIG. 5, but may be performed in one or more varying orders as applicable and in accordance with the present disclosure. In various embodiments, the method 200 may be scheduled to run based on one or more predetermined events, and/or may run continuously during operation of the electrified vehicle 20. The method 200 reads 202 the torque demand as indicated by the throttle position sensor 80. The input on the throttle is an indication of how fast and how much the electrified vehicle 20 is being accelerated and determines the amount of torque to be supplied by the electric machine 30. The torque demand correlates with heat generation and generally indicates the amount of cooling needed by the system components. The amount of cooling needed by the rotor 86 may be determined based on modelling using computational software and/or by experimentation/characteristic testing for various torque demands. Accordingly, the torque demand may be equated to an amount of flow needed by the rotor 86, such as by using a lookup table or another model. The method 200 computes 204 the flow rate of the fluid 88 needed to cool the rotor 86 based on the torque demand resulting in the computed flow rate 204.

The method 200 reads 206 the DC voltage as indicated by the DC voltage sensor 51. The DC voltage is an indication of how much current the system may require to satisfy the machine's power requirements. Higher currents are required at lower voltages for equivalent power requirements. Current is directly related to copper losses of the machine. The amount of flow needed by the rotor 86 may be determined based on modelling using computational software and/or by experimentation/characteristic testing for various DC voltages. Accordingly, the DC voltage may be equated to an amount of flow needed by the rotor 86, such as by using a lookup table or another model. The method 200 computes 208 the flow rate of the fluid 88 needed to cool the rotor 86 based on the DC voltage resulting in the computed flow rate 208.

The method 200 reads 210 the speed of the electric machine 30 as indicated by the vehicle speed sensor 82 or the machine speed sensor 28. The speed sensor 82 may be the sensor used for determining speed of the electrified vehicle 20 and directly correlates to the rotational speed of the electric machine 30. The machine speed sensor 28 directly relates to the rotor speed and may be used in the motor controls. The rotational speed of the electric machine 30 is an indication of how much heat is generated by the rotor 86. The amount of flow needed by the rotor 86 may be determined based on modelling using computational software and/or by experimentation/characteristic testing for various speeds. Accordingly, the speed may be equated to an amount of flow needed by the rotor 86, such as by using a lookup table or another model. The method 200 computes 212 the flow rate of the fluid 88 needed to cool the rotor 86 based on the speed resulting in the computed flow rate 212.

The method 200 computes 214 a composite flow rate for cooling the rotor 86. Given the computed flow rates 204, 208 and 212, a single flow rate requirement for the rotor 86 is determined. In embodiments, the largest in magnitude of the computed flow rates 204, 208 and 212 may be selected ensuring that the computed composite flow rate 214 meets all of the individual flow rates. In other embodiments, each of the computed flow rates 204, 208 and 212 may be weighted and aggregated to compute 214 a composite flow rate that considers all parameters. For example, a multi-dimensional lookup table may be used to factor in each of the computed flow rates 204, 208 and 212 to give a single flow rate that factors in any cumulative effect of the parameters. The computed 214 composite flow rate is the flow rate to be achieved by the opening setting of the control valve 76.

The method 200 adds the computed 214 composite flow rate to the flow requirements of the pump 72 for supplying the gear unit 32 and the stator 84 to determine 216 a pump flow rate. The determined 216 pump flow rate may be a reduced value based on the computed 214 composite flow rate for the rotor 86. Because the control valve 76 is throttled more pressure remains available to supply the gear unit 32 and the stator 84. Accordingly, a compounded efficiency improvement may be realized that benefits from a reduction in drag for the rotor 86 and a reduction in energy consumption by the electric motor 73 of the pump 72. The method 200 sets 218 the control valve 76 to supply the computed 214 composite flow rate to the rotor 86, such as by selecting a corresponding current (or voltage) value from a lookup table, and sets the pump speed to supply the required flow rate from the pump 72, such as by selecting a current (or voltage) value from another lookup table. Setting the opening state of the control valve 76 via a variable current and/or voltage signal and setting the speed of the pump 72 via a variable current and/or voltage signal enables providing a dynamically controlled fluid flow rate as a function of operating conditions. The setting of the control valve 76 corresponds to cooling needs of the rotor 86. The speed setting of the pump 72 may be reduced when cooling needs of the rotor 86 are reduced, compounding the savings as less electrical energy is needed to rotate the rotor 86 and the electric motor 73 of the pump 72. For example, when maximum torque demands are placed on the electric machine 30, such as during acceleration, the control valve 76 may be fully opened. When less torque is required, the control valve 76 may be actively closed to different degrees based on the level of the demand. When little torque is required to maintain speed of the electrified vehicle 20, the control valve 76 may be fully closed to maximize efficiency. The speed of the pump 72 may be increased when flow to the rotor 86 is increased and decreased when flow to the rotor 86 is decreased. A similar approach may apply to the parameters of speed and sump temperature, where the proportion the control valve 76 is open is related to the magnitude of the parameter. Monitoring the parameters enables ongoing active control during operation of the electrified vehicle 20. The method 200 may repeatedly return to step 202 for as long as the propulsion system 26 is in operation.

In the present implementation, the permanent magnet flux may be controlled via the flow of the fluid 88 through the rotor. Whereas a general objective of reducing motor temperature and hence reducing rotor temperature may exist, certain motor operating regions may actually benefit from higher rotor temperatures. For example, at relatively high torque demands, cooler permanent magnets will provide higher flux which benefits torque production per unit stator current, thus benefitting the machine torque production while also reducing machine power consumption and copper losses at the rotor. At relatively low torque demands, and particularly at higher speeds (e.g., above base speed) where high magnetic flux from the permanent magnets results in higher back EMF and hence higher field weakening stator current components, warmer permanent magnets will provide lower flux which reduces the back EMF and field weakening stator current components, thus resulting in lower machine power consumption and reduced copper losses at the stator windings and reduced iron losses in steel-laminations. In the present embodiment wherein flow control of the fluid 88 through the rotor 86 inversely affects flow of the fluid through the stator 84, reducing flow through the rotor 86 during moderate and low torque demands to effect permanent magnet temperature increases and flux reductions results in flow increases through the stator 84, lower temperature of the stator 84 and advantageously lower machine power consumption and reduced copper losses at the stator. Advantageously, since driving cycles may include significant operation of the motor within low to moderate torque regions, such selective fluid flow control may improve overall drive cycle performance efficiency and range.

Through the foregoing, a propulsion system 26 with a cooling system 68 enables controlling flow rates to the rotor 86 and improving efficiency through selective temperature control of the rotor and permanent magnet flux. In addition, simultaneous inverse control of the rotor cooling flow rate and stator cooling flow rate provides additional efficiency benefits not previously achieved.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for rotor flux control in a permanent magnet (PM) electric machine, comprising:
    controlling a fluid flow through a rotor based upon an operating point of the PM electric machine such that the rotor receives a reduced fluid flow when the operating point of the PM electric machine is below a predetermined threshold relative to a fluid flow when the operating point of the PM electric machine is above the predetermined threshold, and
    controlling a fluid flow through a stator of the PM electric machine inversely relative to the fluid flow received by the rotor such that the stator receives an increased fluid flow when the rotor receives a reduced fluid flow.

2. The method for rotor flux control in a PM electric machine of claim 1, wherein the operating point of the PM electric machine comprises a PM electric machine torque and the predetermined threshold comprises a torque threshold.

3. The method for rotor flux control in a PM electric machine of claim 1, wherein the operating point of the PM electric machine comprises a PM electric machine torque at a machine speed, and the predetermined threshold comprises a torque threshold at the machine speed.

4. The method for rotor flux control in a PM electric machine of claim 1, wherein the operating point of the PM electric machine comprises a PM electric machine torque at a machine speed at a DC voltage, and the predetermined threshold comprises a torque threshold at the machine speed at the DC voltage.

5. The method for rotor flux control in a PM electric machine of claim 1, wherein controlling the fluid flow through the rotor comprises controlling the fluid flow with a solenoid valve.

6. The method for rotor flux control in a PM electric machine of claim 1, wherein controlling the fluid flow through the rotor based upon the operating point of the PM electric machine such that the rotor receives the reduced fluid flow when the operating point of the PM electric machine is below the predetermined threshold relative to the fluid flow when the operating point of the PM electric machine is above the predetermined threshold occurs above a predetermined PM electric machine speed.

7. The method for rotor flux control in a PM electric machine of claim 6, wherein the predetermined PM electric machine speed comprises a base speed for the PM machine.

8. A propulsion system for an electrified vehicle, comprising:
    a permanent magnet (PM) electric machine;
    a gear unit connected to the PM electric machine;
    a cooling system for controllably circulating a fluid through passages in a rotor of the PM electric machine, the cooling system including a variable force solenoid valve receiving a pressurized fluid and controlling circulation of the pressurized fluid through the rotor in response to a control command; and
    a controller providing the control command effecting a fluid flow through the rotor based upon an operating point of the PM electric machine such that the fluid flow through the rotor is reduced when the operating point of the PM electric machine is below a predetermined threshold relative to a fluid flow through the rotor when the operating point of the PM electric machine is above the predetermined threshold, wherein the cooling system for controllably circulating the fluid through passages in the rotor of the PM electric machine diverts fluid not circulated through the passages in the rotor of the PM electric machine through a stator of the PM electric machine such that the stator receives an increased fluid flow when the rotor receives a reduced fluid flow.

9. The propulsion system for the electrified vehicle of claim 8, wherein the operating point of the PM electric machine comprises a PM electric machine torque and the predetermined threshold comprises a torque threshold.

10. The propulsion system for the electrified vehicle of claim 8, wherein the operating point of the PM electric machine comprises a PM electric machine torque at a machine speed, and the predetermined threshold comprises a torque threshold at the machine speed.

11. The propulsion system for the electrified vehicle of claim 8, wherein the operating point of the PM electric machine comprises a PM electric machine torque at a machine speed at a DC voltage, and the predetermined threshold comprises a torque threshold at the machine speed at the DC voltage.

12. The propulsion system for the electrified vehicle of claim 8, wherein the controller providing the control command effecting the fluid flow through the rotor based upon the operating point of the PM electric machine such that the fluid flow through the rotor is reduced when the operating point of the PM electric machine is below the predetermined threshold relative to the fluid flow through the rotor when the operating point of the PM electric machine is above the predetermined threshold further provides the control command above a predetermined PM electric machine speed.

13. A method for rotor flux control in a permanent magnet (PM) electric machine, comprising:

controlling a fluid flow through a rotor based upon an operating point of the PM electric machine including a torque versus a speed such that the rotor receives a reduced fluid flow when the torque of the PM electric machine at the speed of the PM electric machine is below a predetermined torque threshold relative to a fluid flow when the torque of the PM electric machine at the speed of the PM electric machine is above the predetermined torque threshold; and controlling a fluid flow through a stator of the PM electric machine inversely relative to the fluid flow through the rotor such that the stator receives an increased fluid flow when the rotor receives a reduced fluid flow.

14. The method for rotor flux control in a PM electric machine of claim 13, wherein the operating point of the PM electric machine further includes a DC link voltage and controlling the fluid flow through the rotor is based upon the operating point of the PM electric machine in torque versus speed and the DC link voltage.

15. The method for rotor flux control in a PM electric machine of claim 13, wherein controlling the fluid flow through the rotor comprises controlling the fluid flow with a solenoid valve.

16. The method for rotor flux control in a PM electric machine of claim 13, wherein controlling the fluid flow through the rotor based upon the operating point of the PM electric machine such that the rotor receives the reduced fluid flow when the torque of the PM electric machine at the speed of the PM electric machine is below a predetermined torque threshold relative to the fluid flow when the torque of the PM electric machine at the speed of the PM electric machine is above the predetermined torque threshold occurs above a predetermined PM electric machine speed.

17. The method for rotor flux control in a PM electric machine of claim 16, wherein the predetermined PM electric machine speed comprises a base speed for the PM machine.

18. The method for rotor flux control in a PM electric machine of claim 14, wherein controlling the fluid flow through the rotor based upon the operating point of the PM electric machine such that the rotor receives the reduced fluid flow when the torque of the PM electric machine at the speed and the DC link voltage of the PM electric machine is below a predetermined torque threshold relative to the fluid flow when the torque of the PM electric machine at the speed and the DC link voltage of the PM electric machine is above the predetermined torque threshold occurs above a predetermined PM electric machine speed.

* * * * *